March 6, 1956 — G. L. McCARGAR — 2,737,000
METHOD OF WRAPPING ARTICLES
Filed Oct. 21, 1952 — 3 Sheets-Sheet 1
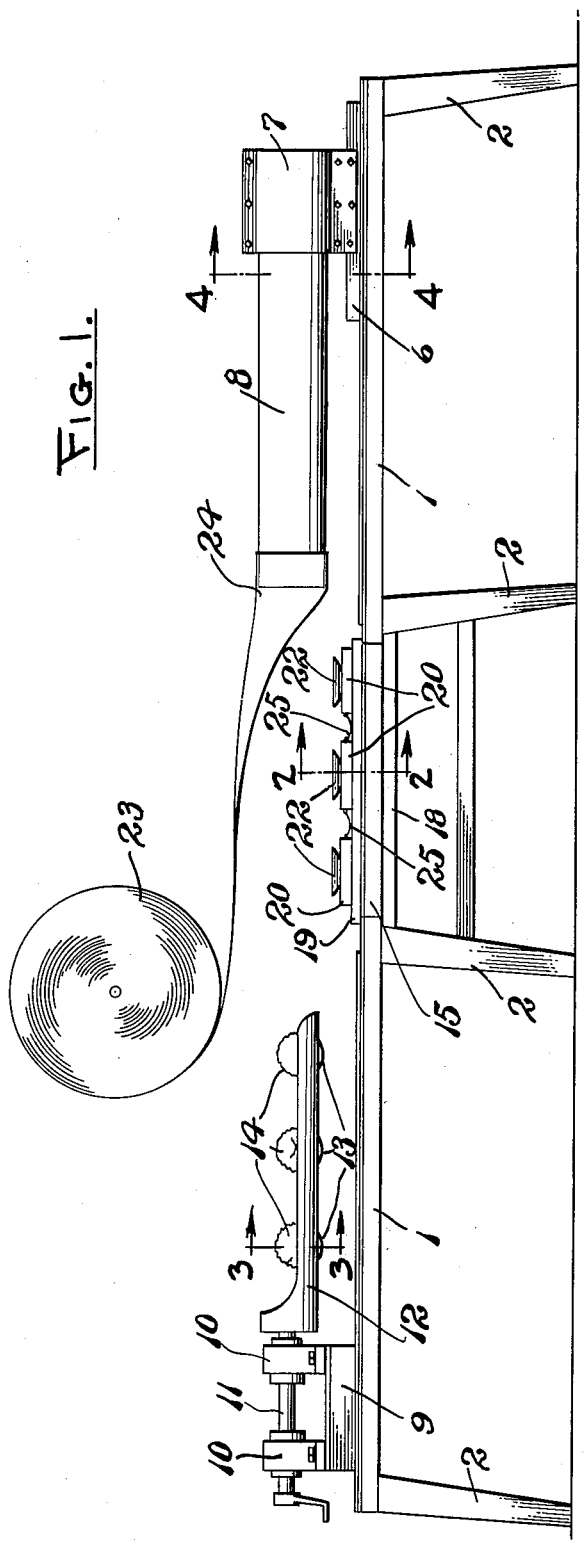
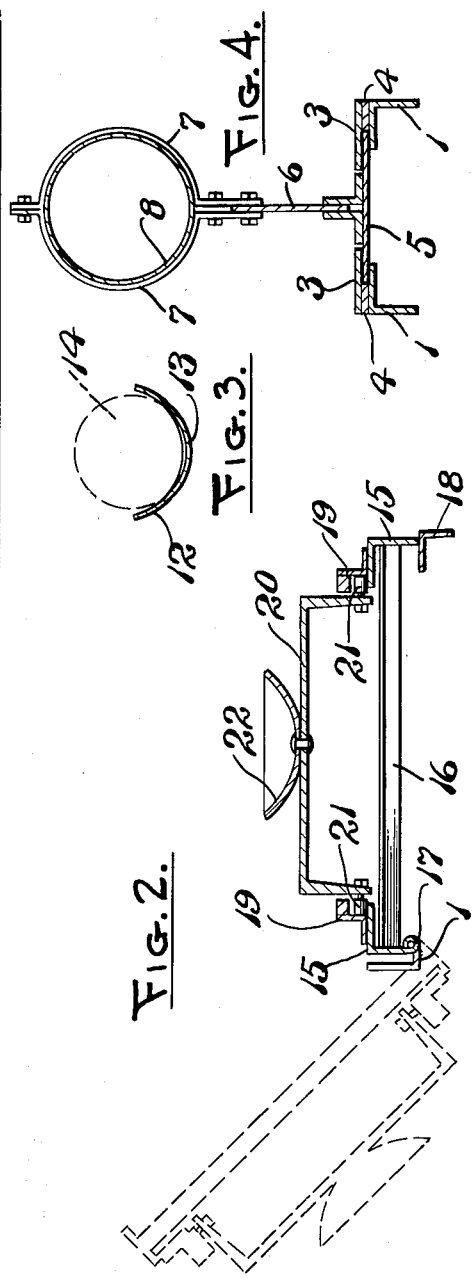
INVENTOR
GEORGE L. McCARGAR
BY Harold C. Van Antwerp
ATTORNEY

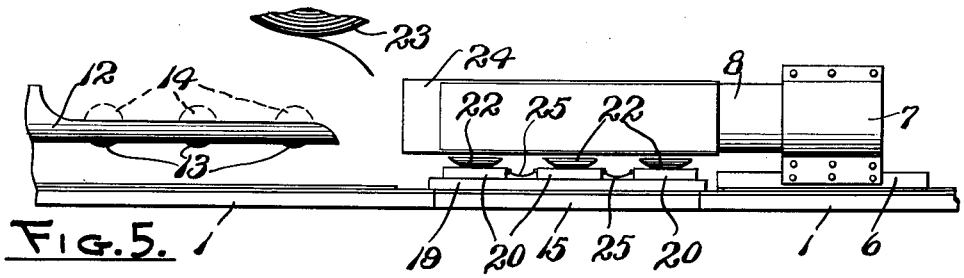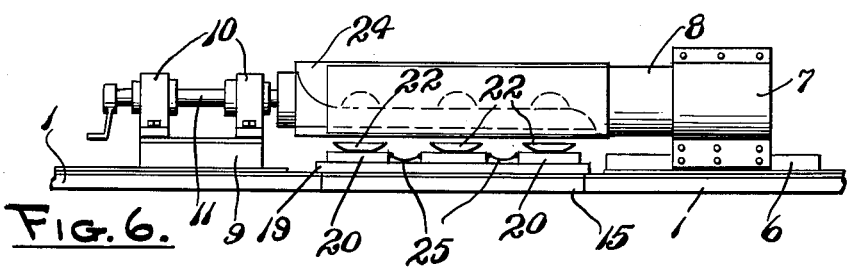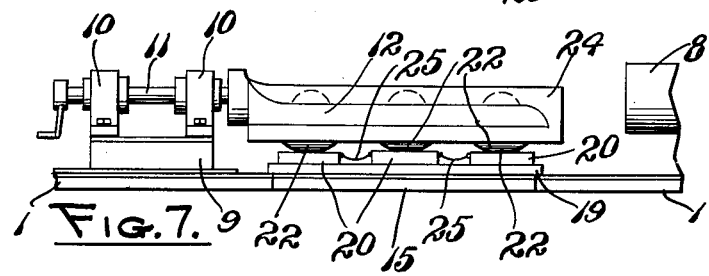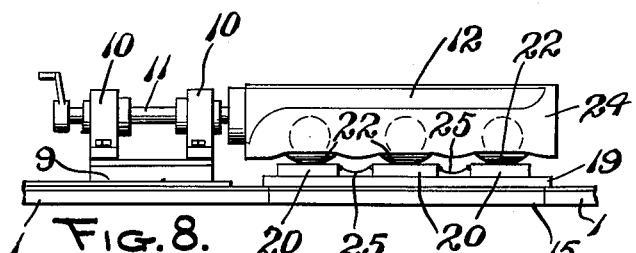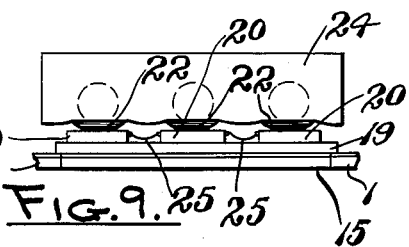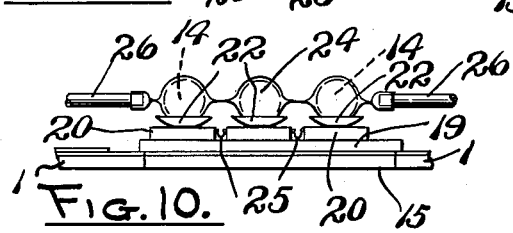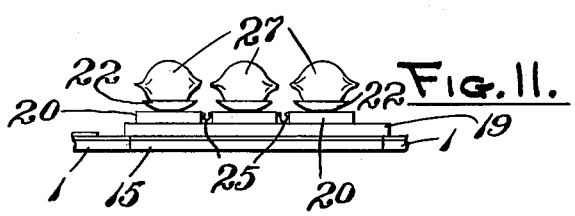

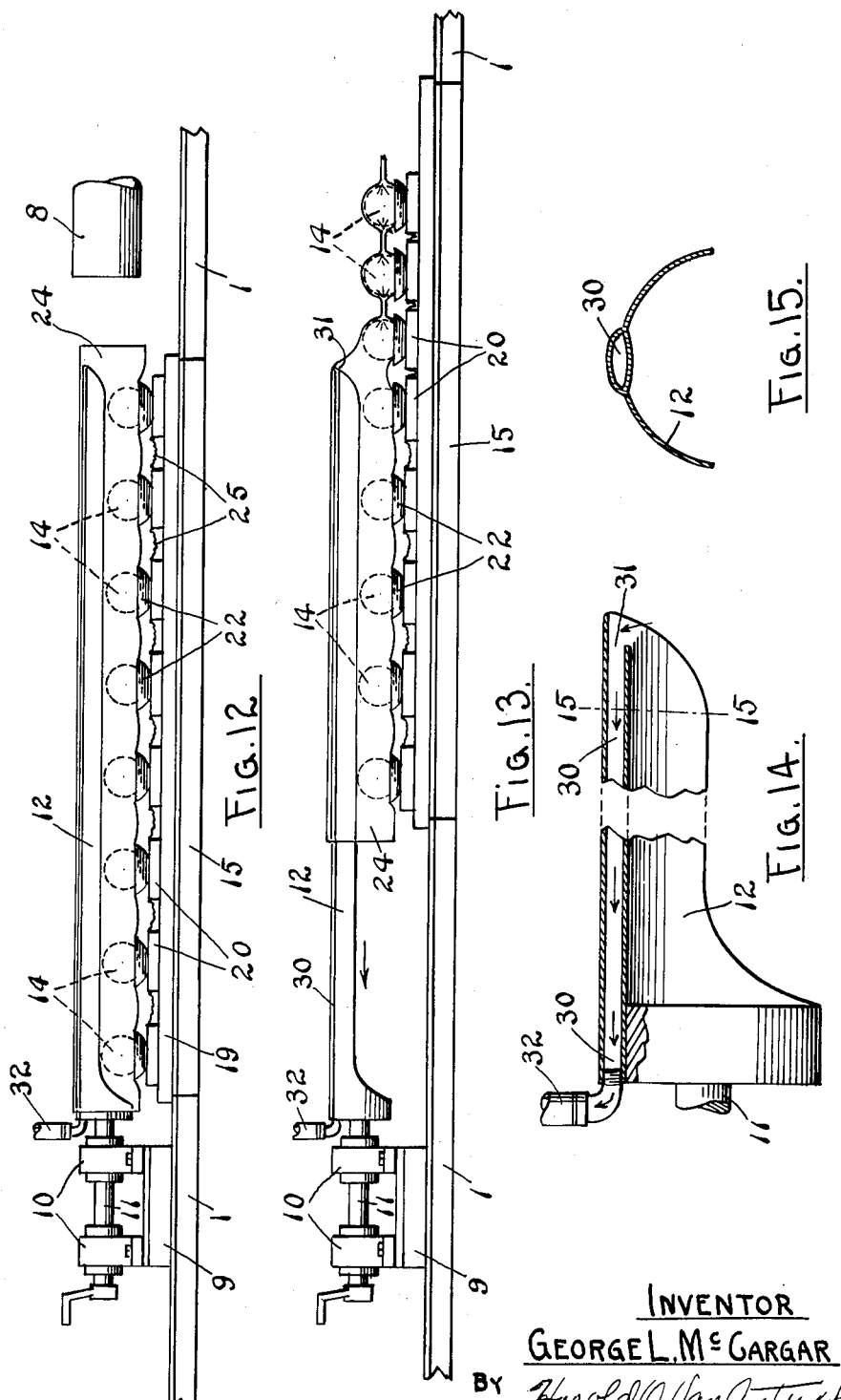

United States Patent Office 2,737,000
Patented Mar. 6, 1956

2,737,000

METHOD OF WRAPPING ARTICLES

George L. McCargar, Chicago, Ill.

Application October 21, 1952, Serial No. 315,887

4 Claims. (Cl. 53—48)

This invention relates to a wrapping apparatus, and a method of wrapping vegetables, fruit or the like of an approximately or generally spherical form, or other articles of similar form. In connection with vegetables and fruit, head lettuce and grapefruit are examples which, desirably, are wrapped and sealed in a covering envelope for protection against injury, wilting and other things which would cause them damage, each head of lettuce or grapefruit, or other similar vegetable or fruit product, being individually enclosed and wrapped, preferably in a moisture and airproof envelope.

The present invention has for its object and purpose a novel method and a very practical, useful and novel apparatus for expeditiously wrapping and sealing, individually, such food articles in order that they may be preserved and kept in good condition for much longer times than before, and to produce an apparatus which is very effective in use for carrying out the wrapping method which I have provided, and by means of which the wrapping and sealing is economically attained with a large quantity production. An understanding of the invention may be had from the following description, taken in connection with the accompanying drawings, in which:

Fig. 1 is a side elevation of the wrapping machine which I preferably use in carrying out the wrapping method.

Figs. 2, 3 and 4 are, respectively, transverse vertical sections enlarged, substantially on the planes of lines 2—2, 3—3 and 4—4 of Fig. 1.

Fig. 5 is a fragmentary elevation showing the machine illustrated in Fig. 1 in the second of the successive steps which are followed in wrapping, Fig. 1 showing the initiation of the first step.

Figs. 6, 7, 8 and 9 are fragmentary elevations showing succeeding successive steps of the wrapping operation and the position of the parts of the mechanism during the successive stages of operation.

Fig. 10 is an elevation, similar to Fig. 9, showing the enclosing envelope around a plurality of the objects which are to be wrapped collapsed, with the articles individually wrapped and with the enclosing envelopes for each article integrally connected together.

Fig. 11 is a like view showing the final step, after several articles are simultaneously wrapped, each in its envelope being separated from each other.

Figs. 12 and 13 are fragmentary elevations of the machine showing a modified form of machine and method for performing the final stages of the operation.

Fig. 14 is an enlarged sectional elevation of the article holder, and

Fig. 15 is a transverse section on the line 15—15 of Fig. 14.

Like reference characters refer to like parts in the different figures of the drawing.

In the construction of the apparatus which has been built and is used, two pairs of spaced elongated horizontal frame bars 1 are located in alignment and are supported by legs 2, adjacent ends of the bars 1, which preferably are of L-shape or angle iron form, being separated a distance from each other. The spaced bars at each end of the frame of course will be suitably transversely connected.

On one of the pairs of bars 1 at one end of the machine, guides are provided, one over each of the horizontal legs of the bars 1, by upper flat plates 3 separated from the horizontal legs by spacer bars 4 as shown in Fig. 4, making guides for the edge portions of a flat horizontal plate 5, which is the bottom of a movable carriage. The carriage is completed by members attached to its upper side, including a vertical plate 6 with suitable angle connections between its lower edge portions and the plate 5 as shown. Clamps 7, generally in the form of half circular bands, are secured to and extend above the vertical plate 6 and are used to clamp upon and firmly connect a hollow horizontal cylinder 8 at one of its ends, such cylinder extending from the clamp 7 toward the inner ends of the frame bars 1.

The carriage with the cylinder 8 is movable back and forth horizontally, so that the cylinder 8 may be moved from its outer position shown in Fig. 1, to an inner position shown in Figs. 5 and 6, where it will be located over the mechanism which, later described, is mounted between the adjacent inner ends of the two pairs or series of frame bars 1.

At the opposite end and slidably mounted on the opposite bars 1 in the same manner, a bed or carriage 9 is located extending upwardly, which carries two spaced apart journals 10, through which a horizontal shaft 11 passes, mounted for rotation therein. The shaft is shown as manually turned by crank, but may be rotated in any suitable manner. At the inner end of the shaft and extending toward the cylinder 8 is an article-holding member, substantially in the form of an elongated scoop 12 of sheet metal which, as shown in Figs. 1 and 3, is arc-shaped in cross section and is located below the axis of the shaft 11. At a plurality of spaced apart places in the length of the member 12 downwardly pressed shallow recesses 13 are provided so that an article of generally spherical form, such as a head of lettuce 14, may be placed therein and will remain and not move accidentally or aimlessly lengthwise of the member. On rotating the shaft 11 and turning the holder 12 over, or through 180 degrees, the articles 14 will tend to drop by gravity.

In the intermediate space between the adjacent spaced apart ends of the two series of bars 1, one at each end of the frame of the machine, a filler frame is located, including two spaced apart angle bars 15 connected by cross bars 16. One of the bars 15 is hingedly connected at the lower edge of its vertical leg to an adjacent fixed bar 18, which, like the bars 1, is rigid and with another bar 18 at the opposite side of the machine, is secured to the middle supporting posts 2. Such frame and the parts carried thereby may be swung from the position shown in Figs. 1 and 2, about the axes of hinges 17, laterally to the dash line position shown in Fig. 2.

Two retainer and guide bars 19, one secured at the upper side of each of the horizontal legs of the bars 15, provide guides and retainers for a plurality of members 20 which are shown as of an inverted channel form, from the downwardly extending flanges, of which rollers 21 enter between the horizontal legs of bars 15 and the overhead retainers of the guide bars 19. Attached to the top of each of the members 20 is a shallow cup 22 of sheet metal.

The wrapping material which, preferably, is of cellophane or similar moisture-proof, transparent, thermoplastic material, is in elongated tubular form, the tube being flattened and rolled into a roll 23 mounted above the frame as shown, and adapted to be carried to and passed at its end over the cylinder 8. The flattened tube is opened to its cylindrical form so that the free end of the cylinder 8 may enter it, as indicated at 24 in Fig. 1. The plurality of cup-carrying members 20, shown as three number, are connected together by flexible connectors 25, such as light chains or the like.

With the machine in the position shown in Fig. 1, a number of the articles 14 to be wrapped are placed in the holder 12, one at each of the recesses 13. The wrapper is unwound and telescoped over the cylinder 8 by either drawing it over such cylinder or by moving the carriage which carries the cylinder to the left (Fig. 1) to the position shown in Fig. 5. The wrapping cylinder is then cut transversely so that a single cylindrical wrapper 24 for the plurality of articles 14 is located directly over the shallow cups 22.

The cylinder 8 (Fig. 4) is hollow. The carriage 9 is moved so as to enter the holder 12 and the articles 14 to be wrapped into the cylinder 8 (Fig. 6). The carriage 6 is thereafter withdrawn to its original position, as in Fig. 7, whereupon the cylindrical wrapper 24 drops and rests upon the spaced cups 22. The shaft 11 is turned through 180°, the articles 14 to be wrapped dropping by gravity against the lower side of the wrapper 24 and pressing it into the several cups 22, as in Fig. 8. Carriage 9 is moved back to its initial position, leaving the cylindrical wrapper with the articles therein as in Fig. 9.

Air is exhausted from the wrapper 24. One end may be sealed and at the other a connection made with an air exhaust mechanism having a connecting nozzle as indicated at 26; or both ends may be supplied with such air exhaust apparatus. Exhaustion of the air collapses the wrapper and at the same time the wrapper may be held at one end and twisted about its longitudinal axis. This shortens the wrapper, but as the articles 14 are extended partly into the shallow cups 22, shortening of the wrapper automatically moves the members 20 toward each other with a slacking of the chains 25 (see Fig. 10). The process is then done, except for cutting the wrapper across between the several articles and between the outermost articles and the exhaust mechanisms at 26, leaving each article with its envelope, thus providing individually wrapped and sealed articles as shown at 27 in Fig. 11. The delivery of the wrapped articles from the apparatus may be made by turning the frame 15 and attached parts to the dash line position shown in Fig. 2. On the returning to initial position the mechanism is ready for a succeeding, identical wrapping cycle.

Instead of the twisting of the wrapper between the wrapped articles it is conceived that the wrapper may be simultaneously sealed and severed at these points by use of heated shears which will, at the same time they are severing the wrapper, also seal the thermoplastic material closed at the point of severance.

It has been found in treating a large number of articles, such as shown in Figs. 12 and 13, and applying suction to exhaust the air at the ends only of the wrapper tube 24, that the tube has a tendency to close tightly around those articles at the ends of row and thus prevent the suction and air evacuation from the center portion of the tube. To overcome this difficulty, the modified structure of Figs. 12–15 had been provided.

The elongated scoop-shaped holder 12 has an air passage 30 extending its entire length, this passage 30 having an inlet opening 31 adjacent the outer, unsupported end of the holder and being connected by a flexible hose 32 with said source of air suction.

In operating this modified device, the same method as heretofore described is carried through to the point illustrated in Fig. 8. Then air suction in the passage 30 is commenced and the holder is slowly withdrawn. The end of the cylindrical wrapper 24 may be closed by any suitable means, such as squeezing it together by hand. As the holder is withdrawn the air is drawn from the tube 24 through the inlet opening 31, and the air is exhausted from around each individual article and the wrapper collapsed therearound progressively as the end of the holder 12 and its inlet opening 31 passes over them, thus insuring complete air exhaustion and tight wrapping of each article.

After being thus treated, the wrapper is severed between the wrapped articles as heretofore described.

From the foregoing it is apparent that individual articles of a general or approximate spherical shape, such as head lettuce, grapefruit and others of similar conformation, are rapidly and effectively, individually sealed and protected from outside dirt, dust or other undesired ingredients coming to them, retaining the moisture of the articles within the sealed individual wrapper. While a simultaneous wrapping of three of the articles to be wrapped is illustrated, it is of course to be understood that the number may be increased, and the dimensions of the member 8 and of the tubular wrapper 23 changed to correspond to the sizes of the articles to be wrapped. The method followed is novel, very practical, economical and efficient.

Having thus described my invention, what I desire to claim and secure by Letters Patent is as follows:

1. A wrapping and sealing machine of the class described comprising, means for supporting an elongated flexible preformed tubular wrapper in open position, means for simultaneously placing a plurality of articles in longitudinally spaced relation to each other within said wrapper, and means for exhausting air from the interior of said wrapper whereby the wrapper is caused to collapse around said articles.

2. A wrapping and sealing machine of the class described comprising, a substantially horizontal tubular wrapper support adapted to be inserted into an elongated flexible preformed tubular wrapper, means for simultaneously inserting a plurality of articles into said tubular support and wrapper in longitudinally spaced relation to each other, means for withdrawing both said tubular support and said inserting means from said wrapper, and means for exhausting air from the interior of said wrapper.

3. A wrapping and sealing machine of the class described comprising a substantially horizontal tubular wrapper support adapted to be inserted into an elongated flexible tubular wrapper, an article support rotatably mounted at one end and insertible at its other end into said tubular wrapper support, means for withdrawing said wrapper support from said wrapper and article support, means for rotating said article support whereby articles thereon are deposited in said wrapper, means for withdrawing said article support from said wrapper and means for exhausting air from the interior of said wrapper.

4. The elements of claim 3 in which said means for exhausting air from the wrapper includes a conduit having an inlet at the end of the article support remote from its supported end and said exhaustion of air occurs while the article support is being withdrawn from said wrapper whereby air is exhausted progressively from around each article from end to end of the wrapper.

References Cited in the file of this patent

UNITED STATES PATENTS

| | | |
|---|---|---|
| 1,970,193 | Riebel | Aug. 14, 1934 |
| 2,145,941 | Maxfield | Feb. 7, 1939 |
| 2,387,812 | Sonneborn | Oct. 30, 1945 |
| 2,432,373 | Beam | Dec. 9, 1947 |
| 2,468,517 | Salfisberg | Apr. 26, 1949 |
| 2,633,684 | Rohdin | Apr. 7, 1953 |